US012561022B2

(12) United States Patent
Li et al.

(10) Patent No.: US 12,561,022 B2
(45) **Date of Patent: \*Feb. 24, 2026**

(54) DISPLAY PANEL AND DISPLAY APPARATUS HAVING VARIOUS HEIGHTS OF DAM STRUCTURES AND VARIOUS WIDTH OF TOUCH WIRES

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Chunyan Li, Beijing (CN); Jingquan Wang, Beijing (CN); Xueguang Hao, Beijing (CN); Xinyin Wu, Beijing (CN); Xinguo Li, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/955,144

(22) Filed: Nov. 21, 2024

(65) Prior Publication Data

US 2025/0085804 A1    Mar. 13, 2025

Related U.S. Application Data

(63) Continuation of application No. 18/603,664, filed on Mar. 13, 2024, now Pat. No. 12,455,649, which is a
(Continued)

(30) Foreign Application Priority Data

Jul. 9, 2021    (CN) .......................... 202110776190.6

(51) Int. Cl.
*G06F 3/041* (2006.01)

(52) U.S. Cl.
CPC ........ *G06F 3/04164* (2019.05); *G06F 3/0412* (2013.01)

(58) Field of Classification Search
CPC .. G06F 3/0412; G06F 3/04164; G06F 3/0446; G06F 3/044; G06F 3/041;
(Continued)

(56) References Cited

U.S. PATENT DOCUMENTS

2013/0106747 A1* 5/2013 Choi ..................... G06F 3/0446
345/173
2015/0027753 A1* 1/2015 Huang ................... G06F 3/041
174/251
(Continued)

*Primary Examiner* — Richard J Hong
(74) *Attorney, Agent, or Firm* — Dilworth & Barrese, LLP.; Michael J. Musella, Esq.

(57) ABSTRACT

A display panel and a display device are provided, the display panel includes a base substrate and a touch wire including a first sub-portion and a second sub-portion, a main surface of the base substrate is a first surface; the second sub-portion includes a first height portion and a second height portion, a height of the first height portion relative to the first surface is smaller than a height of the second height portion relative to the first surface, line widths of respective positions of the first height portion are inversely proportional to heights of the respective positions of the first height portion relative to the first surface, and line widths of respective positions of at least part of the second height portion are proportional to heights of the respective positions of the at least part of the second height portion relative to the first surface.

19 Claims, 8 Drawing Sheets

Related U.S. Application Data continuation of application No. 18/021,410, filed as application No. PCT/CN2022/102312 on Jun. 29, 2022, now Pat. No. 12,008,193.

(58) Field of Classification Search
CPC ...... G06F 3/0443; H10K 59/12; H10K 50/11; H05B 33/02; H01L 22/12
See application file for complete search history.

(56) References Cited

U.S. PATENT DOCUMENTS

| | | | | |
|---|---|---|---|---|
| 2016/0365395 A1* | 12/2016 | Xu | ........................... | H10K 59/12 |
| 2018/0102502 A1* | 4/2018 | Kim | ........................ | H01L 22/12 |
| 2018/0366520 A1* | 12/2018 | Gwon | ................... | G06F 3/0443 |
| 2019/0363275 A1* | 11/2019 | Ochi | ...................... | H05B 33/02 |
| 2020/0127220 A1* | 4/2020 | Kim | ........................ | H10K 50/11 |
| 2020/0357859 A1* | 11/2020 | An | ........................ | G06F 3/0446 |
| 2023/0074441 A1* | 3/2023 | An | ........................... | G06F 3/044 |

* cited by examiner

DISPLAY PANEL AND DISPLAY APPARATUS HAVING VARIOUS HEIGHTS OF DAM STRUCTURES AND VARIOUS WIDTH OF TOUCH WIRES

CROSS REFERENCE TO RELATED APPLICATIONS

The present application is a continuation application of the U.S. application Ser. No. 18/603,664, which is a continuation application of the U.S. application Ser. No. 18/021, 410, which is a U.S. National Phase Entry of International Application No. PCT/CN2022/102312 filed on Jun. 29, 2022, which claims the priority to Chinese patent application No. 202110776190.6, filed on Jul. 9, 2021, the entire disclosure of which is incorporated herein by reference as part of the disclosure of this application for any purpose.

TECHNICAL FIELD

Embodiments of the present disclosure relate to a display panel and a display device.

BACKGROUND

AMOLED (Active-matrix organic light emitting diode) display is a self-luminous display and has advantages of faster response, higher contrast, wider viewing angle, or the like, so the AMOLED has been more and more widely used. With the rapid development of AMOLED technology, displays have gradually entered the generation of full screens and folding screens. In order to bring users a better experience, display products such as a flexible and wearable screen, a foldable screen or the like will become an important development tendency in the display field in the future.

SUMMARY

At least one embodiment of the disclosure provide a display panel. The display panel comprises a display region and a peripheral region surrounding the display region, and further comprises: a base substrate, a driving circuit layer, a display structure layer, an encapsulation layer, a touch electrode and a touch wire; the driving circuit layer is provided on the base substrate; the display structure layer is provided on a side of the driving circuit layer facing away from the base substrate; the encapsulation layer, provided on a side of the display structure layer facing away from the base substrate; the touch electrode is provided on a side of the encapsulation layer facing away from the base substrate, and at least located in the display region; and the touch wire is provided on the side of the encapsulation layer facing away from the base substrate, and electrically connected to the touch electrode. The touch wire comprises a first sub-portion and a second sub-portion electrically connected to the first sub-portion, a main surface of the base substrate close to the touch wire is a first surface, and a distance between the first sub-portion and the first surface is smaller than a distance between the second sub-portion and the first surface; and the second sub-portion comprises a first height portion and a second height portion electrically connected to the first height portion, the first height portion is located between the first sub-portion and the second height portion, a height of the first height portion relative to the first surface is smaller than a height of the second height portion relative to the first surface, line widths of respective positions of the first height portion are inversely proportional to heights of the respective positions of the first height portion relative to the first surface, and line widths of respective positions of at least part of the second height portion are proportional to heights of the respective positions of the at least part of the second height portion relative to the first surface.

For example, in the display panel provided by at least one embodiment of the disclosure, an average line width of the first height portion is smaller than an average line width of the second height portion.

For example, in the display panel provided by at least one embodiment of the disclosure, a ratio of a maximum line width of the first height portion to a maximum line width of the second height portion ranges from 0.50 to 0.95.

For example, in the display panel provided by at least one embodiment of the disclosure, a height of the second sub-portion, corresponding to a boundary line between the first height portion and the second height portion, relative to the first surface is H, and a line width of the second sub-portion corresponding to the boundary line is W, then H/W=0.150~0.375.

For example, in the display panel provided by at least one embodiment of the disclosure, an average line width of the first sub-portion is smaller than an average line width of the second sub-portion.

For example, in the display panel provided by at least one embodiment of the disclosure, a height of the second sub-portion relative to the first surface at a position is h, an included angle between a surface of the second sub-portion facing away from the base substrate and the first surface is θ, and a line width of the second sub-portion at the position is d, then $0<H<3$ μm, $0<θ<30°$; and a compensation width of d relative to W is Δd, and $Δd=(d-W)=K*(h-H)/\tan θ$, where $0.5<K<10$.

For example, in the display panel provided by at least one embodiment of the disclosure, $1$ μm$<H<2.5$ μm, $15°<θ<25°$; and the compensation width of d relative to W is Δd, and $Δd=(d-W)=K*(h-H)/\tan θ$, where $0.5<K<2$.

For example, in the display panel provided by at least one embodiment of the disclosure, $1.2$ μm$<H<1.7$ μm, $17°<θ<23°$; and the compensation width of d relative to W is Δd, and $Δd=(d-W)=K*(h-H)/\tan θ$, where $0.8<K<1.3$.

For example, the display panel provided by at least one embodiment of the disclosure further comprises an organic structure. The organic structure is at least partially located in the peripheral region, the touch wire is provided on a side of the organic structure facing away from the base substrate, at least one edge of the organic structure intersects with an extending direction of the touch wire, and the organic structure comprises an organic slope portion and an organic flat portion.

For example, in the display panel provided by at least one embodiment of the disclosure, the second sub-portion comprises a slope portion and a flat portion, the slope portion comprises the first height portion and a part of the second height portion, the flat portion comprises the other part of the second height portion, and a slope degree of the slope portion of the second sub-portion is substantially the same as a slope degree of the organic slope portion; and an orthographic projection of the slope portion of the second sub-portion on the base substrate overlaps with an orthographic projection of the organic slope portion on the base substrate, and an orthographic projection of the flat portion of the second sub-portion on the base substrate overlaps with an orthographic projection of the organic flat portion on the base substrate.

For example, in the display panel provided by at least one embodiment of the disclosure, the slope degree of the organic slope portion changes continuously.

For example, in the display panel provided by at least one embodiment of the disclosure, the organic slope portion comprises a first slope sub-portion and a second slope sub-portion, and the second slope sub-portion is located on a side of the first slope sub-portion facing the organic flat portion; and an average slope degree of the first slope sub-portion is greater than an average slope degree of the second slope sub-portion.

For example, in the display panel provided by at least one embodiment of the disclosure, the organic structure further comprises a dam, the dam at least partially surrounds the display region, and the dam comprises a first dam portion located on at least one side of the display region; and the touch wire comprises a first wire portion, an extending direction of the first wire portion intersects with an extending direction of the first dam portion, and an orthographic projection of at least part of the first wire portion on the base substrate overlaps with an orthographic projection of the first dam portion on the base substrate.

For example, in the display panel provided by at least one embodiment of the disclosure, the first dam portion comprises a plurality of sub-dams arranged at intervals in a direction facing away from the display region, the first sub-portion comprises a first portion of the first wire portion located between adjacent sub-dams among the plurality of sub-dams, and the second sub-portion comprises a second portion of the first wire portion located on a side of each of the plurality of sub-dams facing away from the base substrate.

For example, in the display panel provided by at least one embodiment of the disclosure, a ratio of a length of the first portion in an extending direction of the first portion to a width of the first portion in a direction perpendicular to the extending direction of the first portion ranges from 1.4 to 3.4.

For example, in the display panel provided by at least one embodiment of the disclosure, a ratio of a length of the first portion in an extending direction of the first portion to a width of each of the plurality of sub-dams ranges from 0.7 to 1.3; and a width of each of the plurality of sub-dams is in a direction perpendicular to an extending direction of each of the plurality of sub-dams.

For example, in the display panel provided by at least one embodiment of the disclosure, the driving circuit layer comprises a pixel driving circuit and a data line electrically connected to the pixel driving circuit, the display structure layer comprises a light-emitting element, the pixel driving circuit is configured to be electrically connected to the light-emitting element to drive the light-emitting element, the data line is configured to provide a data signal to the pixel driving circuit, the peripheral region further comprises a fan-out data signal line, and the fan-out data signal line is electrically connected to the data line; and an orthographic projection of the fan-out data signal line on the base substrate at least partially overlaps with an orthographic projection of the first dam portion on the base substrate, and the orthographic projection of the fan-out data signal line on the base substrate at least partially overlaps with an orthographic projection of the first wire portion on the base substrate.

For example, in the display panel provided by at least one embodiment of the disclosure, an extending direction of at least part of the fan-out data signal line intersects with an extending direction of the first dam portion, and intersects with an extending direction of the first wire portion.

For example, in the display panel provided by at least one embodiment of the disclosure, the extending direction of the first dam portion is substantially perpendicular to the extending direction of the first wire portion.

For example, in the display panel provided by at least one embodiment of the disclosure, the touch wire comprises a first sub-wiring layer and a second sub-wiring layer located on a side of the first sub-wiring layer facing away from the base substrate; the display panel further comprises a touch insulating layer, the touch insulating layer is between the first sub-wiring layer and the second sub-wiring layer, the touch insulating layer comprises a via hole, and the first sub-wiring layer is electrically connected to the second sub-wiring layer through the via hole; and the via hole at least partially overlaps with the first dam portion in a direction perpendicular to the first surface.

For example, in the display panel provided by at least one embodiment of the disclosure, an orthographic projection of the via hole on the base substrate is located within an orthographic projection of the second height portion on the base substrate.

For example, in the display panel provided by at least one embodiment of the disclosure, a ratio of an area of the orthographic projection of the via hole on the base substrate to an area of the orthographic projection of the second height portion on the base substrate is greater than 0.2 and smaller than 0.8.

For example, in the display panel provided by at least one embodiment of the disclosure, a boundary line between the first height portion and the second height portion is substantially aligned with at least part of a boundary line of the via hole.

For example, the display panel provided by at least one embodiment of the disclosure further comprises a shielding structure, wherein an orthographic projection of the shielding structure on the base substrate at least partially overlaps with an orthographic projection of at least one of the plurality of sub-dams on the base substrate; the shielding structure comprises a first shielding structure and a second shielding structure, and a height of the first shielding structure relative to the first surface is greater than a height of the second shielding structure relative to the first surface; and a boundary line between the first height portion and the second height portion at least partially overlaps with the first shielding structure in a direction perpendicular to the first surface.

For example, in the display panel provided by at least one embodiment of the disclosure, at least one of the plurality of sub-dams comprises a first sub-layer and a second sub-layer located on a side of the first sub-layer facing away from the base substrate and stacked with the first sub-layer, the first shielding structure is located between the first sub-layer and the second sub-layer, the second shielding structure is located on a side of the second sub-layer close to the base substrate and does not overlap with the first sub-layer in a direction perpendicular to the base substrate.

For example, in the display panel provided by at least one embodiment of the disclosure, in a direction parallel to the first surface, a ratio of a minimum distance between a boundary line between the first height portion and the second height portion and an edge of the first shielding structure to a width of the first shielding structure in an extending direction of the touch wire ranges from 0.3 to 0.6.

For example, in the display panel provided by at least one embodiment of the disclosure, the touch wire further comprises a third sub-portion and a fourth sub-portion, the organic structure further comprises a first organic structure, the first organic structure covers the display region and a part of the peripheral region, and the first organic structure is located on a side of the dam close to the display region and spaced apart from the dam; the third sub-portion is located between the first organic structure and the dam, and the fourth sub-portion is located on a side of the first organic structure facing away from the base substrate; and line widths of respective positions of at least part of the fourth sub-portion are inversely proportional to distances of the respective positions of the at least part of the fourth sub-portion relative to the first surface.

For example, in the display panel provided by at least one embodiment of the disclosure, an edge of the first organic structure close to the dam intersects with an extending direction of the third sub-portion and the fourth sub-portion.

For example, in the display panel provided by at least one embodiment of the disclosure, an average line width of the fourth sub-portion is smaller than an average line width of the third sub-portion.

For example, in the display panel provided by at least one embodiment of the disclosure, the touch wire further comprises a fifth sub-portion and a sixth sub-portion, the organic structure further comprises a second organic structure, and the second organic structure is located on a side of the dam facing away from the display region and spaced apart from the dam; the fifth sub-portion is located between the dam and the second organic structure, and the sixth sub-portion is located on a side of the second organic structure facing away from the base substrate; and line widths of respective positions of at least part of the sixth sub-portion are inversely proportional to distances of the respective positions of the at least part of the sixth sub-portion relative to the first surface.

For example, in the display panel provided by at least one embodiment of the disclosure, an edge of the second organic structure close to the dam intersects with an extending direction of the fifth sub-portion and the sixth sub-portion.

For example, in the display panel provided by at least one embodiment of the disclosure, an average line width of the sixth sub-portion is smaller than an average line width of the fifth sub-portion.

For example, in the display panel provided by at least one embodiment of the disclosure, a first slope angle is between a slope of the first organic structure on a side close to the dam and the first surface, a second slope angle is between a slope of the second organic structure on a side close to the dam and the first surface, and a third slope angle is between a slope of the dam and the first surface; a difference between the first slope angle and the third slope angle is smaller than or equal to 20°; and/or a difference between the second slope angle and the third slope angle is smaller than or equal to 20°.

At least one embodiment of the disclosure provide a display device. The display device comprises any one of the above display panels provided by the embodiments of the disclosure.

BRIEF DESCRIPTION OF THE DRAWINGS

In order to clearly illustrate the technical solutions of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

Figure 1:
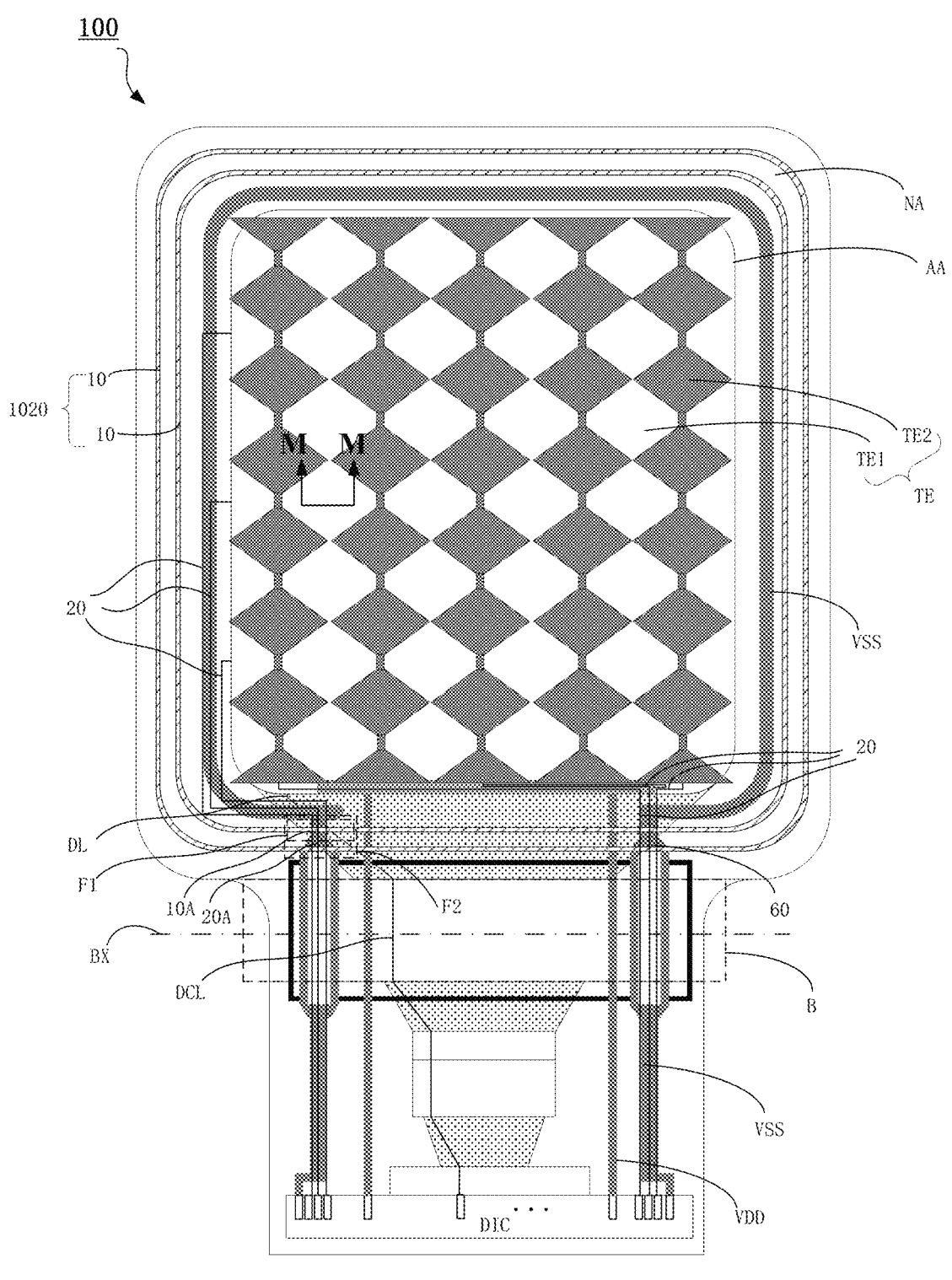
FIG. 1 is a schematic plan view of a display panel provided by at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "left," "right" or the like are only used to indicate relative position relationship, and when the position of the object which is described is changed, the relative position relationship may be changed accordingly.

A display panel is usually provided with a touch structure, and the touch structure is provided on an encapsulation layer of the display panel and includes components such as a touch electrode and a touch wire. The touch wire extends from a display region of the display panel to a non-display region of the display panel to electrically connect the touch electrode to a touch driving circuit, such as a touch IC, located in the non-display region. The touch wire extends along its path and may pass through edges of some functional layers of the display panel, for example, may pass through an edge of an organic layer, an inorganic layer or a metal layer. Because these functional layers have a certain height and extending directions of these functional layers may intersect with an extending direction of at least part of the touch wire, the touch wire may climb from one height to another height when passing through the edges of these functional layers.

For example, taking an organic structure as an example, the touch wire has a large height variation during the touch wire climbs from the bottom of the organic structure to the top of the organic structure. In a manufacturing process of the touch wire, for example, in a process of forming the touch wire through a patterning process, a layer of photoresist needs to be formed on a metal layer for forming the touch wire, and then exposure, development and other processes are performed. In this case, because the touch wire has different heights at different positions during climbing the organic structure, it is easy to accumulate thick photoresist at the climbing positions after the above-mentioned exposure and development processes, resulting in that a region between adjacent touch wires has photoresist residues at the climbing positions. After the photoresist is subsequently removed, metal residues occur, resulting in a short circuit between the adjacent touch wires, then resulting in a touch failure.

For example, the probability of occurrence of the above-mentioned touch failure may be higher near a dam structure where the organic structure is provided to be relatively dense; therefore, a line width of the touch wire at the position climbing the dam structure generally needs to be designed narrower to prevent short circuit between adjacent touch wires. However, the touch wire has a variable height during climbing the dam structure; if the touch wire is designed to have the same line width when designing the patterning process of the touch wire, due to different exposure distance at different heights in the exposure process, the actual line width of the touch wire at a higher height is smaller than the actual line width of the touch wire at a lower height, that is, as the height increases, the actual line width of the touch wire becomes smaller and smaller. Therefore, at a higher position, there may be a problem of disconnection of the touch wire, and the overall resistance value of the touch wire increases, affecting the touch effect of the display panel.

At least one embodiment of the present disclosure provides a display panel, the display panel includes a display region and a peripheral region surrounding the display region, and the display panel includes a base substrate, a driving circuit layer, a display structure layer, an encapsulation layer, a touch electrode, and a touch wire. The driving circuit layer is provided on the base substrate. The display structure layer is provided on a side of the driving circuit layer facing away from the base substrate. The encapsulation layer is provided on a side of the display structure layer facing away from the base substrate. The touch electrode is provided on a side of the encapsulation layer facing away from the base substrate, and at least is located in the display region. The touch wire is provided on the side of the encapsulation layer facing away from the base substrate, and is electrically connected to the touch electrode. The touch wire includes a first sub-portion and a second sub-portion electrically connected to each other, a main surface of the base substrate close to the touch wire is a first surface, and a distance between the first sub-portion and the first surface is smaller than a distance between the second sub-portion and the first surface. The second sub-portion includes a first height portion and a second height portion electrically connected to each other, the first height portion is located between the first sub-portion and the second height portion, a height of the first height portion relative to the first surface is smaller than a height of the second height portion relative to the first surface, line widths of respective positions of the first height portion are inversely proportional to heights of the respective positions of the first height portion relative to the first surface, and line widths of respective positions of at least part of the second height portion are proportional to heights of the respective positions of the at least part of the second height portion relative to the first surface.

In the above-mentioned display panel provided by at least one embodiment of the present disclosure, by performing corresponding width compensation on the part of the touch wire with a higher climbing height, it can ensure that adjacent touch wires are not short-circuited at the climbing positions, and avoid the disconnection of the touch wire caused by a higher climbing height of the touch wire, thereby improving the manufacturing yield of the touch wire and improving the touch effect of the display panel.

The display panel provided by the embodiments of the present disclosure will be described below through several specific embodiments.

Figure 2:
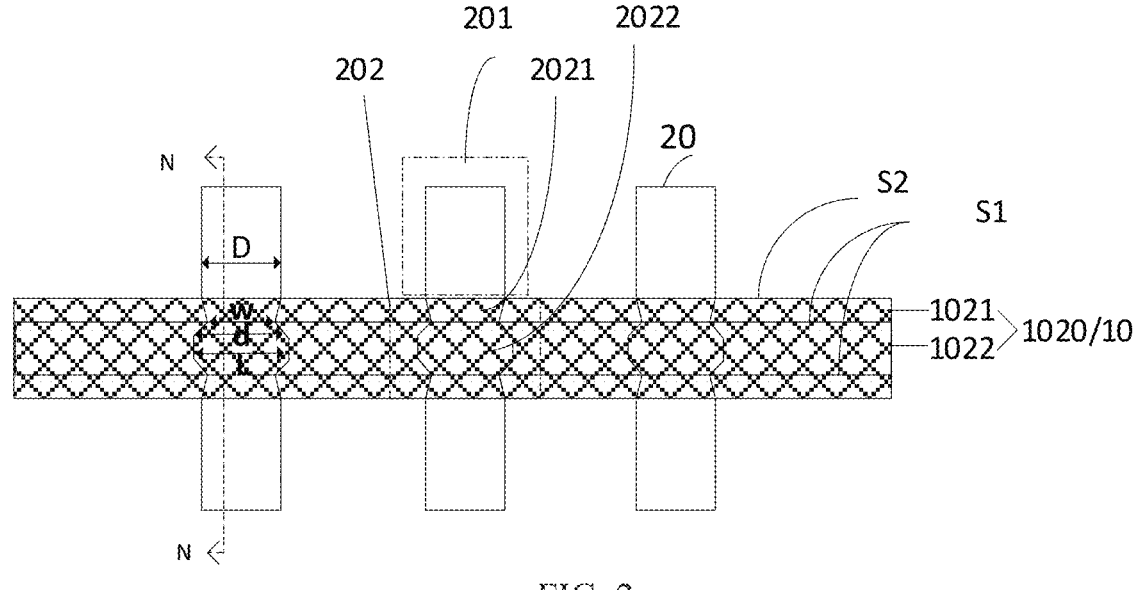
FIG. 2 is a schematic enlarged view of a portion of the display panel in FIG. 1 in a dotted frame F1.
Figure 3:
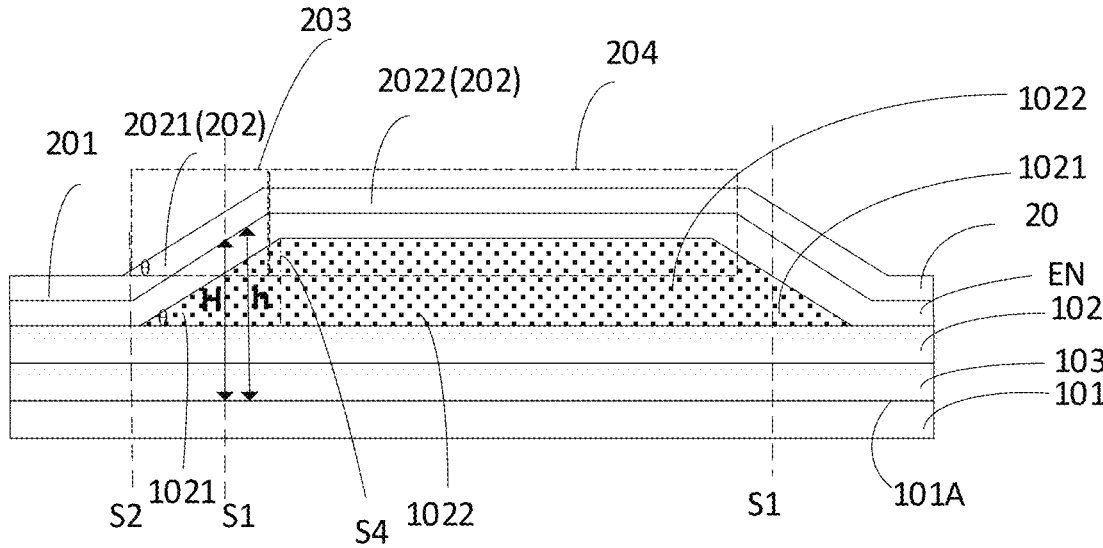
FIG. 3 is a schematic cross-sectional view of the display panel in FIG. 2 along a line N-N.

At least one embodiment of the present disclosure provides a display panel. FIG. 1 illustrates a schematic plan view of the display panel, FIG. 2 illustrates a schematic enlarged view of a portion of the display panel in a dotted frame F1 in FIG. 1, FIG. 3 illustrates a schematic cross-sectional view of the display panel in FIG. 2 along a line N-N, and FIG. 4 illustrates a schematic cross-sectional view of the display panel in FIG. 1 along a line M-M.

As illustrated in FIG. 1-FIG. 4, the display panel 100 includes a display region AA and a peripheral region NA surrounding the display region AA, and the display panel 100 further includes a base substrate 101, a driving circuit layer 102, a display structure layer, an encapsulation layer EN, a touch electrode TE, a touch wire 20 and other structures.

For example, the display panel 100 includes a plurality of sub-pixels arranged in array, each sub-pixel includes a pixel driving circuit and a light-emitting element EM, and the pixel driving circuit is configured to be electrically connected to the light-emitting element EM to drive the light-emitting element EM.

Figure 4:
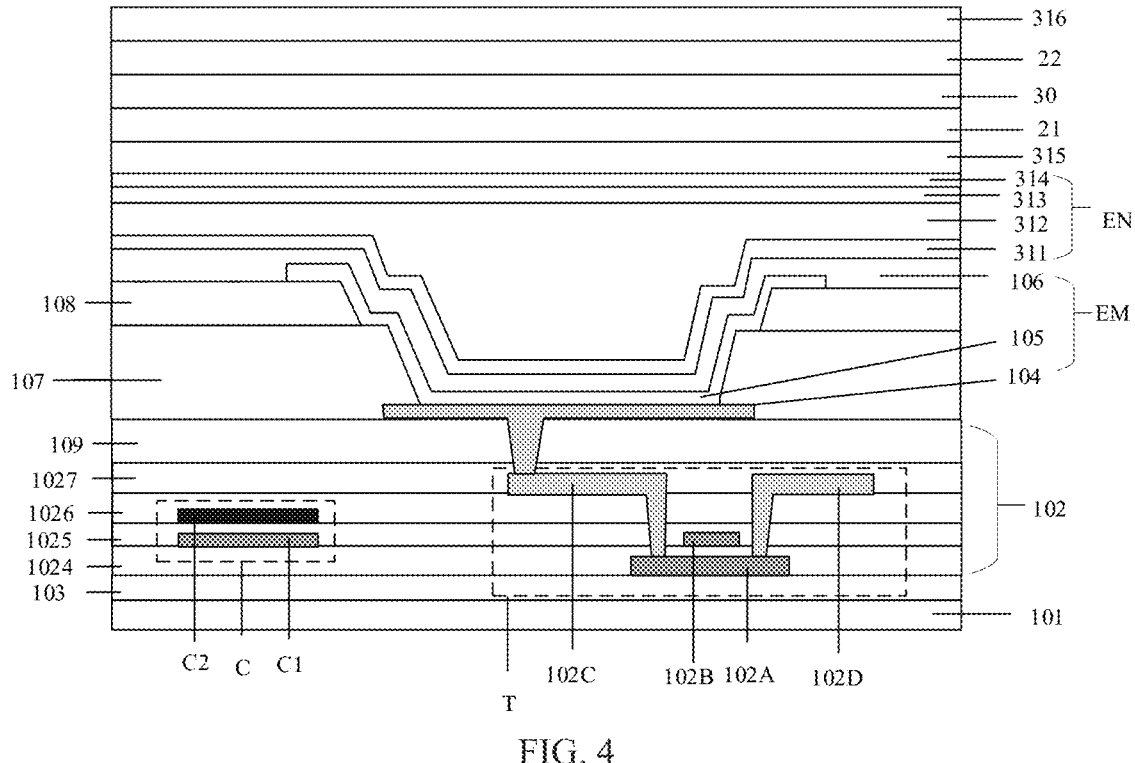
FIG. 4 is a schematic cross-sectional view of the display panel in FIG. 1 along a line M-M.

For example, as illustrated in FIG. 4, the driving circuit layer 102 is provided on the base substrate 101 and includes pixel driving circuits of the plurality of sub-pixels, and the pixel driving circuit includes structures such as a thin film transistor T, a storage capacitor C or the like. The display structure layer is provided on a side of the driving circuit layer 102 facing away from the base substrate 101, and includes light-emitting elements EMs of the plurality of sub-pixels. The encapsulation layer EN is provided on a side of the display structure layer facing away from the base substrate 101, for example, includes a plurality of encapsulation sub-layers for encapsulating the display structure layer.

For example, the touch electrode TE is provided on a side of the encapsulation layer EN facing away from the base substrate 101, and is at least located in the display region AA to provide a touch function at least in the display region AA. For example, as illustrated in FIG. 1, the touch electrode TE includes a touch driving electrode TE1 and a touch sensing electrode TE2 for a mutual-capacitance touch mode, for example, one of the touch driving electrode TE1 and the touch sensing electrode TE2 is a driving electrode and the other one is a sensing electrode. The touch wire 20 is provided on the side of the encapsulation layer EN facing away from the base substrate 101, and is electrically connected to the touch electrode TE for electrically connecting the touch electrode TE to a driving circuit DIC located in the peripheral region NA.

For example, as illustrated in FIG. 2 and FIG. 3, the touch wire 20 includes a first sub-portion 201 and a second sub-portion 202 electrically connected to the first sub-portion 201. As illustrated in FIG. 3, a boundary line between the first sub-portion 201 and the second sub-portion 202 is S2, a main surface of the base substrate 101 close to the touch wire 20 is a first surface 101A, and a distance between the first sub-portion 201 and the first surface 101A is smaller than a distance between the second sub-portion 202 and the first surface 101A. For example, the second sub-portion 202 includes a first height portion 2021 and a second height portion 2022 electrically connected to the first height portion 2021. As illustrated in FIG. 3, a boundary line between the first height portion 2021 and the second height portion 2022 is S1, the first height portion 2021 is located between the first sub-portion 201 and the second height portion 2022, and a height of the first height portion 2021 relative to the first surface 101A is smaller than a height of the second height portion 2022 relative to the first surface 101A. In conjunction with FIG. 2 and FIG. 3, line widths of respective positions of the first height portion 2021 are inversely proportional to heights of the respective positions of the first height portion 2021 relative to the first surface 101A, and line widths of respective positions of at least part of the second height portion 2022 are proportional to heights of the respective positions of the at least part of the second height portion 2022 relative to the first surface 101A.

During the manufacturing process of the display panel, for the first height portion 2021, as the height of the first height portion 2021 gradually increases, the distance between a surface of the touch wire 20 and an exposure light source gradually decreases, causing that a line width of the touch wire at a higher height is smaller than a line width of the touch wire at a lower height, that is, as the height of the first height portion 2021 increases, the line width of the touch wire becomes smaller and smaller. In order to avoid the risk of disconnection of the touch wire because the line width of the touch wire becomes smaller and smaller, the line width compensation starts at the second height portion 2022, that is, for the second height portion 2022, as the height of the second height portion 2022 gradually increases, the line width of the second height portion 2022 gradually increases to achieve the purpose of compensating the line width, and avoid defects such as disconnection of the touch wire 20.

It should be noted that, in the embodiments of the present disclosure, the line width of a structure means a width of the structure in a direction perpendicular to an extending direction of the structure. For example, as illustrated in FIG. 2, for the touch wire 20, the extending direction is the vertical direction in the figure, and the line width is the width of the touch wire 20 in the horizontal direction in the figure. For example, as illustrated in FIG. 2, for an organic structure 1020/dam 10 (described in detail later), the extending direction is the horizontal direction in the figure, and the line width is the width of the organic structure 1020/dam 10 in the vertical direction in the figure.

For example, in some embodiments, an average line width of the first sub-portion 201 is smaller than an average line width of the second sub-portion 202. For example, in the second sub-portion 202, an average line width of the first height portion 2021 is smaller than an average line width of the second height portion 2022. Therefore, the second height portion 2022 has a higher height and further has a higher average line width, thereby avoiding possible defects such as breakage of the touch wire due to the short distance between the second height portion 2022 and the exposure light source during the manufacturing process.

It should be noted that, in the embodiments of the present disclosure, the average line width of a structure refers to an average value of line widths of respective positions of the structure.

For example, in some embodiments, as illustrated in FIG. 2, a maximum line width of the first height portion 2021 is D, and a maximum line width of the second height portion 2022 is L, then a ratio of the maximum line width D of the first height portion 2021 to a maximum line width L of the second height portion 2022 ranges from 0.50 to 0.95, such as 0.55, 0.60, 0.65, 0.70, or the like. Within this width range, it can not only realize that there is no short circuit between the adjacent touch wires 20, but also avoid possible defects such as breakage that may occur in the second height portion 2022 with a higher height.

For example, in some embodiments, the first height portion 2021 is adjacent to the first sub-portion 201, and the first sub-portion 201 has a uniform line width, which is equal to the maximum line width D of the first height portion 2021, that is, the line width corresponding to a boundary line S2 between the sub-portion 201 and the first height portion 2021. For example, D ranges from 7.0 μm to 9.0 μm, such as 7.5 μm, 8.0 μm, 8.5 μm, or the like. For example, the line width (i.e., D) of the first height portion 2021 close to the first sub-portion 201 is larger than the line width (i.e., W) of the first height portion 2021 facing away from the first sub-portion 201.

For example, the maximum line width L of the second height portion 2022 after compensation depends on the maximum height of the second height portion 2022. Considering that the distance between adjacent touch wires 20 is about 30 μm in the display panel, if the line width after compensation is too large, it may cause short-circuit of the adjacent touch wires 20, therefore, the range of L is 12.0 μm to 14.0 μm, such as 12.5 μm, 13.0 μm, 13.5 μm, or the like. The ratio of D to L is D/L=0.5~0.75. If the value of D/L is less than 0.5, it may cause a short circuit between the adjacent touch wires 20; and if the value of D/L is greater than 0.75, the line width compensation effect may be not obvious, and the risk of wire breakage cannot be effectively avoided.

For example, in some embodiments, as illustrated in FIG. 3, a height of the second sub-portion 202, corresponding to the boundary line S1 between the first height portion 2021 and the second height portion 2022, relative to the first surface 101A is H; as illustrated in FIG. 2, a line width of the second sub-portion 2022 corresponding to the boundary line S1 is W; then H/W=0.150~0.375, such as 0.200, 0.250, 0.300, or the like. Within the above-mentioned range of values, the line width and the height of the second sub-portion 202 are balanced, which facilitate to realize no short circuit between the adjacent touch wires 20, and avoid possible defects such as breakage that may occur in the second height portion 2022 with a higher height.

For example, in some embodiments, the height H corresponding to the boundary line S1 between the first height portion 2021 and the second height portion 2022 is 1.5 μm to 2.0 μm, such as 1.8 μm, etc., and the line width W is 8.0 μm to 10.0 μm, such as 8.5 μm, 9.0 μm, 9.5 μm, or the like. For example, H is used as a threshold height. The height of the second height portion 2022 exceeds the threshold height H, and the second height portion 2022 needs to be subjected to the line width compensation. The height of the first height portion 2021 is lower than the threshold height H, and the first height portion 2021 does not need to be subjected to the line width compensation.

For example, as illustrated in FIG. 3, a height of the second sub-portion 202 relative to the first surface 101A at a position is h, an included angle between a surface of the second sub-portion 202 facing away from the base substrate 101 and the first surface 101A is θ, and a line width of the second sub-portion at the position is d, then 0<H<3 μm, 0<θ<30°; a compensation width of d relative to W is Δd, then $$\Delta d = (d - W) = K * (h - H) / \tan\theta,$$

where $$0.5 < K < 10.$$

It can be seen that the compensation width Δd of d relative to W is related to factors such as the height of the compensation position, the threshold height H, and the slope angle of the second sub-portion 202, so the compensation width Δd is determined according to the above relationship.

For example, in some embodiments, 1 μm<H<2.5 μm, 15°<θ<25°; the compensation width of d relative to W is Δd, then Δd=(d−W)=K*(h−H)/tan θ, where 0.5<K<2.

For example, in some embodiments, 1.2 μm<H<1.7 μm, 17°<θ<23°; the compensation width of d relative to W is Δd, then Δd=(d−W)=K*(h−H)/tan θ, where 0.8<K<1.3.

Under the above-mentioned parameter design, the compensation width Δd achieves a better compensation effect.

For example, in some embodiments, as illustrated in FIG. 2 and FIG. 3, the display panel further includes an organic structure 1020, and the organic structure 1020 is at least partially located in the peripheral region NA. For example, the touch wire 20 is provided on a side of the organic structure 1020 facing away from the base substrate 101, at least one edge of the organic structure 1020 intersects with the extending direction of the touch wire 20, and the organic structure 1020 includes an organic slope portion 1021 and an organic flat portion 1022. In this case, the touch wire 20 climbs the organic structure 1020, as illustrated in FIG. 3. For example, in some embodiments, as illustrated in FIG. 3, the second sub-portion 202 includes a slope portion 203 and a flat portion 204, the slope portion 203 includes the first height portion 2021 (for example, the entire first height portion 2021) and a part of the second height portion 2022, and the flat portion 204 includes the other part of the second height portion 2022. For example, a slope degree of the slope portion 203 of the second sub-portion 202 is substantially the same as a slope degree of the organic slope portion 1021, that is, the included angle between the slope portion 203 of the second sub-portion 202 and the first surface 101A is substantially the same as the included angle between the organic slope portion 1021 and the first surface 101A, illustrated as θ in the figure. For example, an orthographic projection of the slope portion 203 of the second sub-portion 202 on the base substrate 101 overlaps with an orthographic projection of the organic slope portion 1021 on the base substrate 101, and an orthographic projection of the flat portion 204 of the second sub-portion 202 on the base substrate 101 overlaps with an orthographic projection of the organic flat portion 1022 on the base substrate 101.

For example, in some embodiments, as illustrated in FIG. 3, the slope degree of the organic slope portion 1021 changes continuously, and the slope degree of the slope portion 203 also changes continuously.

Figure 5:
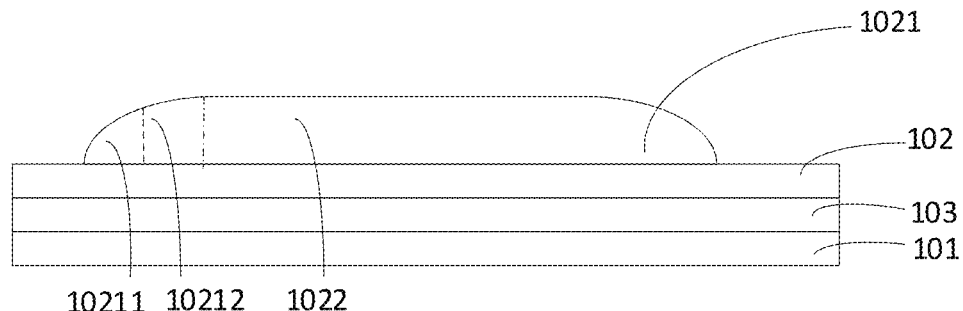
FIG. 5 is a schematic cross-sectional view of an organic structure in the display panel provided by at least one embodiment of the present disclosure.

For example, FIG. 5 illustrates another schematic cross-sectional view of the organic structure. In some other embodiments, as illustrated in FIG. 5, the organic slope portion 1021 includes a first slope sub-portion 10211 and a second slope sub-portion 10212, and the second slope sub-portion 10212 is located on a side of the first slope sub-portion 10211 facing the organic flat portion 1022; and an average slope degree of the first slope sub-portion 10211 is greater than an average slope degree of the second slope sub-portion 10212, that is, the first slope sub-portion 10211 and the second slope sub-portion 10212 present different inclination degrees.

It should be noted that, in the embodiments of the present disclosure, the average slope degree of a structure refers to an average value of the tangent values of the angles between the tangent line of the structure at respective positions and the first surface 101A.

For example, in some embodiments, as illustrated in FIG. 1, the organic structure 1020 includes a dam 10, and the dam 10 at least partially surrounds the display region AA and includes a first dam portion 10A located on at least one side (such as a lower side) of the display region AA. For example, the peripheral region NA includes a bending region B having a bending axis BX, and the bending region B is bendable around the bending axis BX to bend a part of the peripheral region NA to the non-display side of the display panel, thereby reducing the bezel with of the display panel and increasing the screen-to-body ratio of the display panel. For example, as illustrated in FIG. 1, the first dam portion 10A is located between the display region AA and the bending region B. The touch wire 20 includes a first wire portion 20A (for example, a portion of the touch wire 20 located on a lower side of the display region AA), and the extending direction of the first wire portion 20A intersects with the extending direction of the first dam portion 10A, for example, the extending direction of the first wire portion 20A is perpendicular to the extending direction of the first dam portion 10A. An orthographic projection of at least part of the first wire portion 20A on the base substrate 101 overlaps with an orthographic projection of the first dam portion 10A on the base substrate 101, that is, at least part of the first wire portion 20A extends across the first dam portion 10A.

Figure 6:
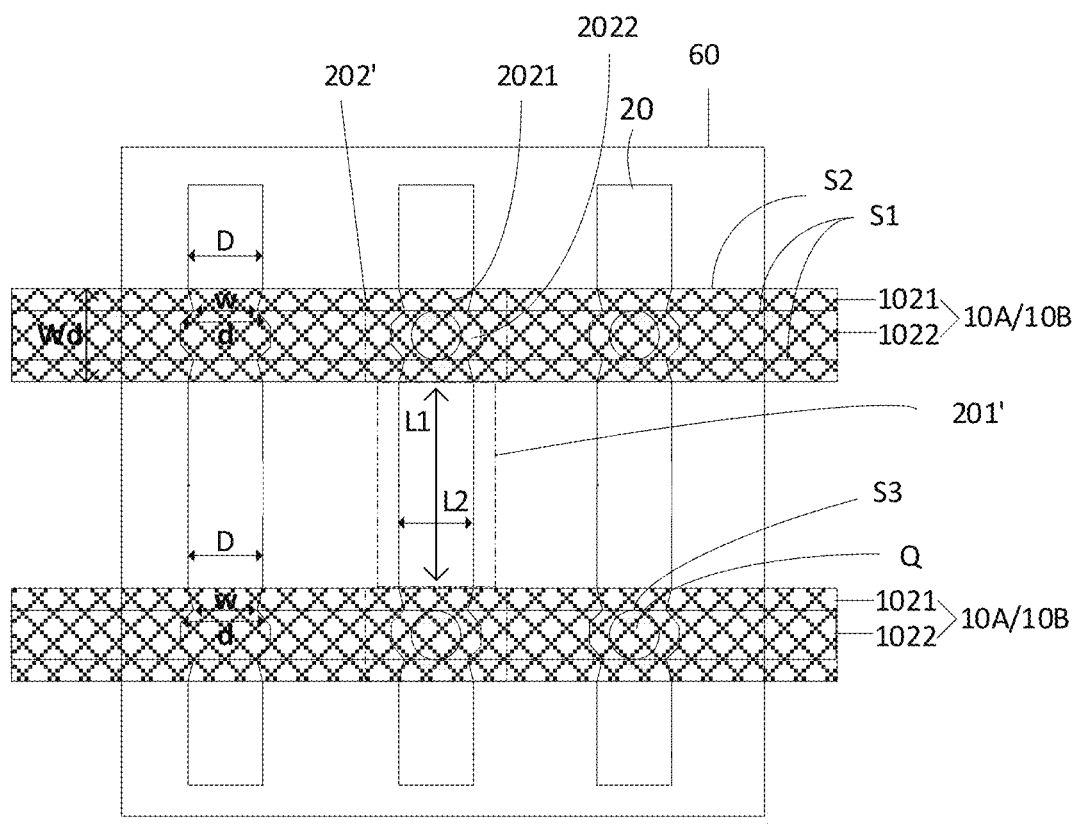
FIG. 6 is a schematic enlarged view of a portion of the display panel in FIG. 1 in a dotted frame F2.

For example, FIG. 6 illustrates a schematic enlarged view of a portion of the display panel in FIG. 1 in a dotted frame F2. As illustrated in FIG. 6, the first dam portion 10A includes a plurality of sub-dams 10B arranged at intervals in a direction facing away from the display region AA, and two sub-dams 10B are illustrated in FIG. 6 as an example. In other embodiments, a total number of the sub-dams 10B may be more than two, and the embodiments of the present disclosure do not limit the total number of the sub-dams 10B. The first sub-portion 201 includes a first portion 201' of the first wire portion 20A located between adjacent sub-dams 10B among the plurality of sub-dams 10B, and the second sub-portion 202 includes a second portion 202' of the first wire portion 20A located on a side of each of the plurality of sub-dams 10B facing away from the base substrate 101.

For example, as illustrated in FIG. 6, a ratio of a length L1 (that is, a length of the first portion 201' in the vertical direction in FIG. 6) of the first portion 201' in the extending direction of the first portion 201' to a width L2 (that is, a width of the first portion 201' in the horizontal direction in FIG. 6) of the first portion 201' in a direction perpendicular to the extending direction of the first portion 201' ranges from 1.4 to 3.4, such as 1.5, 2.0, 2.5, 3.0, or the like.

For example, as illustrated in FIG. 6, a ratio of the length L1 of the first portion 201' in the extending direction of the first portion 201' to a width Wd of each of the plurality of sub-dams 10B ranges from 0.7 to 1.3, such as 0.8, 0.9, 1.1, or the like. The width of each of the plurality of sub-dams 10B is in a direction perpendicular to the extending direction of each of the plurality of sub-dams 10B, and the extending direction of each of the plurality of sub-dams 10B is the horizontal direction in FIG. 6.

Within the above-mentioned ranges, the position and size relationship between the touch wire and the plurality of sub-dams 10B are effectively balanced, the short circuit of the adjacent touch wires 20 can be avoided, and the risk of breakage of some touch wires due to excessive height can further be avoided, while ensuring that the functions of the plurality of sub-dams 10B are not affected.

For example, as illustrated in FIG. 4, the thin film transistor T of the pixel driving circuit included in the driving circuit layer 102 includes an active layer 102A, a gate electrode 102B, a source electrode 102C and a drain electrode 102D, etc., and the storage capacitor C includes a first capacitor electrode C1 and a second capacitor electrode C2. The light-emitting element EM includes a first electrode 104, a second electrode 106, and a light-emitting material layer 105 between the first electrode 104 and the second electrode 106, and the first electrode 104 is electrically connected to the source electrode 102C of the thin film transistor T. For example, the first electrode 104 is an anode of the light-emitting element, and the second electrode 106 is a cathode of the light-emitting element. For example, the first capacitor electrode C1 and the gate electrode 102B are provided in the same layer.

For example, the pixel driving circuit is configured into a structure such as 2T1C (two thin film transistors and one storage capacitor), 6T1C (six thin film transistors and one storage capacitor), etc., thereby including a plurality of thin film transistors, and the plurality of thin film transistors each have a structure similar or identical to the stacked structure illustrated in FIG. 4. FIG. 4 only illustrates the thin film transistor directly connected to the light-emitting element EM, and the thin film transistor is a driving thin film transistor, or a light-emitting control thin film transistor, etc.

It should be noted that, in the embodiments of the present disclosure, "provided in the same layer" means that two (or more) functional layers or structural layers are formed in the same layer in the hierarchical structure of the display substrate and are formed with the same material, that is, in the manufacturing process, the two functional layers or structural layers may be formed from the same material layer, and the required pattern and structure may be formed through the same patterning process. The "provided in the same layer" can simplify the manufacturing process of the display panel.

For example, as illustrated in FIG. 4, the driving circuit layer 102 further includes a first gate insulating layer 1024 provided on the active layer 102A, a second gate insulating layer 1025 provided on the gate electrode 102B, an interlayer insulating layer 1026 provided on the second capacitor electrode C2, a passivation layer 1027 provided on the source electrode 102C and the drain electrode 102D, and a first planarization layer 109 for planarizing the pixel driving circuit. The first planarization layer 109 and the passivation layer 1027 have a via hole exposing the source electrode

102C, and the first electrode 104 is electrically connected to the source electrode 102C through the via hole.

For example, as illustrated in FIG. 4, the display panel further includes structures such as a pixel defining layer 107 for defining the plurality of sub-pixels, a spacer 108, and the like. The pixel defining layer 107 includes a plurality of sub-pixel openings, each sub-pixel opening exposes the first electrode 104 of the light-emitting element EM of one sub-pixel, and the light-emitting material layer 105 and the second electrode 106 are at least partially located in the sub-pixel opening.

For example, as illustrated in FIG. 4, in some embodiments, the encapsulation layer EN includes a first inorganic layer 311, a first organic layer 312, a second inorganic layer 313, and a third inorganic layer 314 which are sequentially stacked. The first organic layer 312 is covered (sandwiched) by the first inorganic layer 311 and the second inorganic layer 313. For example, in some embodiments, the encapsulation layer EN only includes the first inorganic layer 311, the first organic layer 312, and the second inorganic layer 313 which are sequentially stacked, without including the third inorganic layer 314. The embodiments of the present disclosure do not limit the specific structure of the encapsulation layer EN.

For example, in the manufacturing process of the display panel, the first organic layer 312 in the encapsulation layer EN is formed by inkjet printing. In this case, the dam 10 prevents the first organic layer 312 from overflowing to the peripheral region outside the dam 10 during the printing process, and the plurality of sub-dams 10B improves the blocking effect of the dam 10. For example, as illustrated in FIG. 1, the dam 10 is provided to surround the display region AA.

For example, in some embodiments, the dam 10 is provided in the same layer as at least one of the first planarization layer 109, the pixel defining layer 107 and the spacer 108. For example, the dam 10 is provided in the same layer as the first planarization layer 109 and the pixel defining layer 107, or the dam 10 is provided in the same layer as the first planarization layer 109 and the spacer 108, or the dam 10 is provided in the same layer as the first planarization layer 109, the pixel defining layer 107 and the spacer 108.

For example, in the case where the dam 10 includes the plurality of sub-dams 10B, stacked structures of the plurality of sub-dams 10B may be different; for example, one sub-dam 10B is provided in the same layer as the pixel defining layer 107 and the spacer 108, and another sub-dam 10B is provided in the same layer as the first planarization layer 109, the pixel defining layer 107 and the spacer 108. The embodiments of the present disclosure do not limit the specific structure of the dam 10.

For example, in some embodiments, as illustrated in FIG. 1, the display panel further includes a first power supply wire VDD for transmitting a high potential. For example, the first power supply wire VDD is provided in the same layer as the source electrode 102C and the drain electrode 102D. Alternatively, in some embodiments, the first power supply wire VDD includes a first portion and a second portion that are connected in parallel, the first portion is provided in the same layer as the source electrode 102C and the drain electrode 102D, and the second portion is provided in the same layer as the first electrode 104.

For example, as illustrated in FIG. 1, the display panel further includes a second power supply wire VSS for transmitting a low potential. For example, the second power supply wire VSS is provided in the same layer as the source electrode 102C and the drain electrode 102D. Alternatively, the second power supply wire VSS includes a first portion and a second portion that are connected in parallel, the first portion is provided in the same layer as the source electrode 102C and the drain electrode 102D, and the second portion is provided in the same layer as the first electrode 104.

Figure 11:
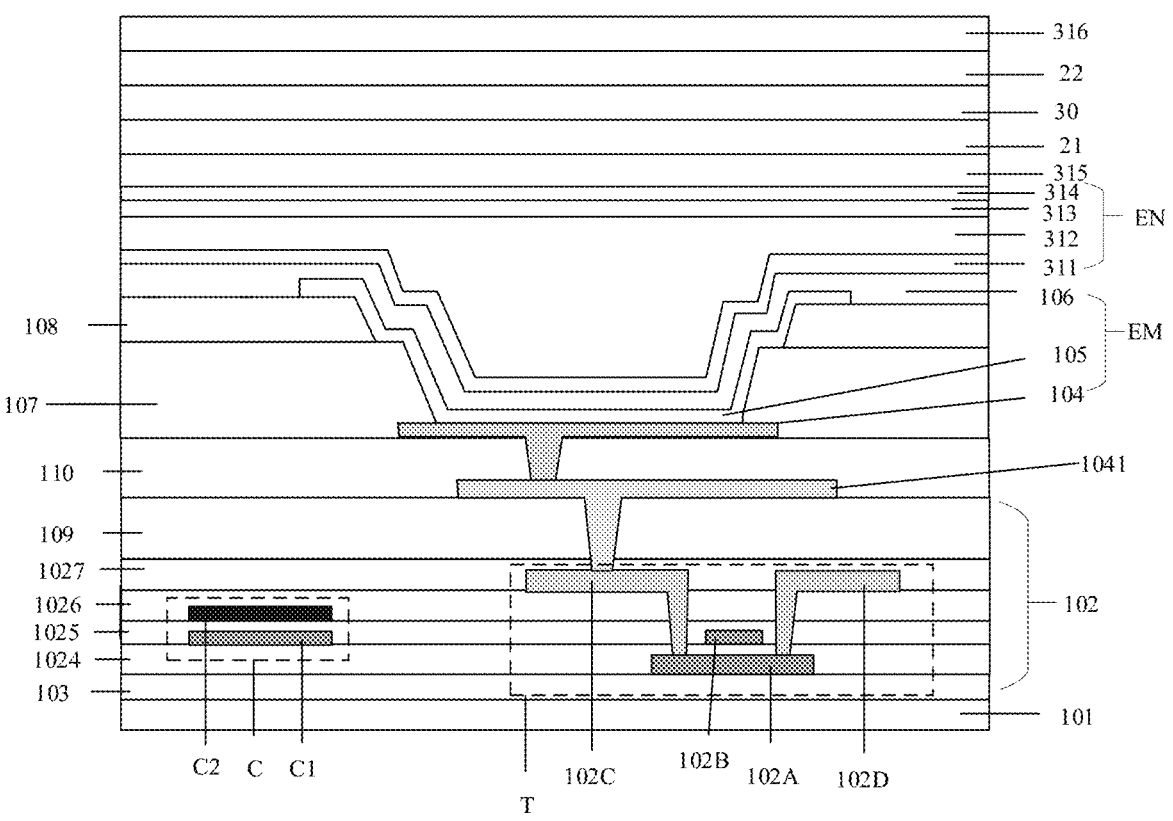
FIG. 11 is another schematic cross-sectional view of the display panel in FIG. 1 along the line M-M.

For example, in some other embodiments, as illustrated in FIG. 11, a connection electrode 1041 and a second planarization layer 110 are provided between the light-emitting element EM and the thin film transistor T, and the first electrode 104 of the light-emitting element EM is electrically connected to the source electrode 102C through the connection electrode 103. For example, the first planarization layer 109 and the passivation layer 1027 have a via hole exposing the source electrode 102C, and the connection electrode 1041 is electrically connected to the source electrode 102C through the via hole. The second planarization layer 110 has a via hole exposing the connection electrode 1041, and the first electrode 104 is electrically connected to the connection electrode 1041 through the via hole. For example, the first power supply wire VDD includes a first portion, a second portion and a third portion that are connected in parallel, the first portion is provided in the same layer as the source electrode 102C and the drain electrode 102D, the second portion is provided in the same layer as the first electrode 104, and the third portion is provided in the same layer as the connection electrode 1041. Similarly, the second power supply wire VSS also includes a first portion, a second portion and a third portion that are connected in parallel, the first portion is provided in the same layer as the source electrode 102C and the drain electrode 102D, the second portion is provided in the same layer as the first electrode 104, and the third portion is provided in the same layer as the connection electrode 1041.

For example, for the display panel illustrated in FIG. 11, the dam 10 is provided in the same layer as at least one of the first planarization layer 109, the second planarization layer 110, the pixel defining layer 107 and the spacer 108. For example, the dam 10 is provided in the same layer as the first planarization layer 109, the second planarization layer 110 and the pixel defining layer 107, or the dam 10 is provided in the same layer as the first planarization layer 109, the second planarization layer 110 and the spacer 108, etc. Similarly, in the case where the dam 10 includes the plurality of sub-dams 10B, stacked structures of the plurality of sub-dams 10B may be different, for example, one sub-dam 10B is provided in the same layer as the pixel defining layer 107 and the spacer 108, and another sub-dam 10B is provided in the same layer as the first planarization layer 109, the second planarization layer 110, the pixel defining layer 107 and the spacer 108. The embodiments of the present disclosure do not limit the specific structure of the dam 10.

For example, in some embodiments, as illustrated in FIG. 1, the display panel further includes a data line DL electrically connected to the pixel driving circuit. For example, the data line DL is electrically connected to the drain electrode 102D of the thin film transistor T and is configured to provide a data signal to the pixel driving circuit. For example, the peripheral region NA further includes a fan-out data signal line DCL, and the fan-out data signal line DCL is electrically connected to the data line DL for electrically connecting the data line DL to the driving circuit DIC located in the peripheral region NA. For example, an orthographic projection of the fan-out data signal line DCL on the base substrate 101 at least partially overlaps with the orthographic projection of the first dam portion 10A on the base substrate 101, and the orthographic projection of the fan-out data signal line DCL on the base substrate 101 at least partially overlaps with the orthographic projection of the first wire portion 20A on the base substrate 101.

For example, in some embodiments, the fan-out data signal line DCL is provided in the same layer as the gate electrode 102B of the thin film transistor T and the first capacitor electrode C1 of the storage capacitor C, or is provided in the same layer as the second capacitor electrode C2 of the storage capacitor C.

For example, in some embodiments, as illustrated in FIG. 1, the extending direction of at least part of the fan-out data signal line DCL intersects with the extending direction of the first dam portion 10A; and the extending direction of at least part of the fan-out data signal line DCL intersects with the extending direction of the first wire portion 20A. For example, a portion of the fan-out data signal line DCL provided between the display region AA and the bending region B extends obliquely with respect to an edge of the display region AA, and the extending direction of this portion of the fan-out data signal line DCL not only intersects with the extending direction of the first dam portion 10A, but also intersects with the extending direction of the first wire portion 20A.

For example, as illustrated in FIG. 2, the extending direction of the first dam portion 10A is substantially perpendicular to the extending direction of the first wire portion 20A. For example, in the example illustrated in FIG. 2, the extending direction of the first dam portion 10A is the horizontal direction in the figure, and the extending direction of the first wire portion 20A is the vertical direction in the figure.

Figure 8:
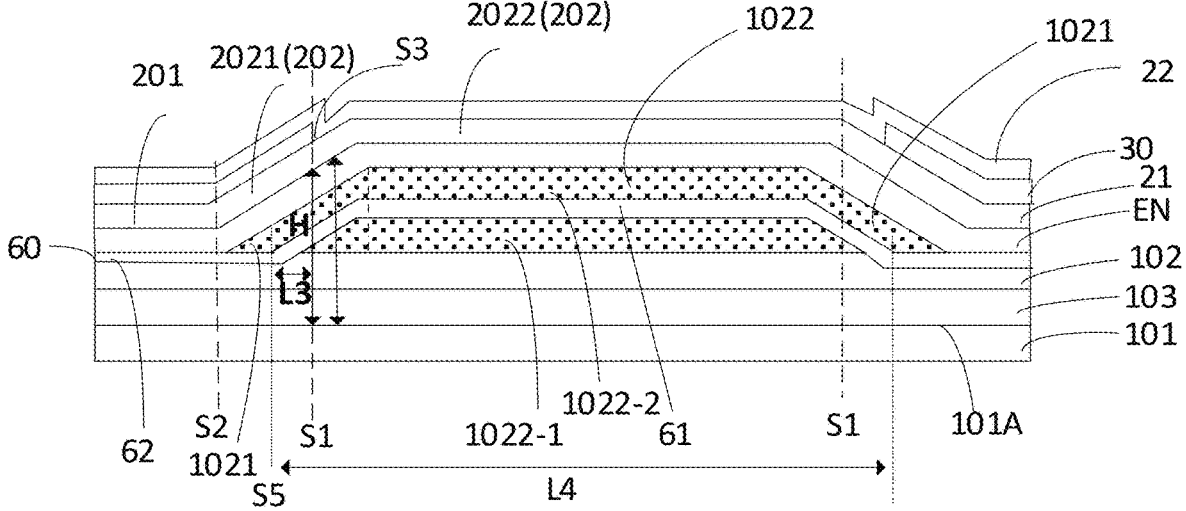
FIG. 8 is yet another schematic cross-sectional view of the display panel in FIG. 2 along the line N-N.

For example, in some embodiments, as illustrated in FIG. 4 and FIG. 8, the touch wire 20 includes a first sub-wiring layer 21 and a second sub-wiring layer 22 provided on a side of the first sub-wiring layer 21 facing away from the base substrate 101. As illustrated in FIG. 8, the display panel further includes a touch insulating layer 30; the touch insulating layer 30 is provided between the first sub-wiring layer 21 and the second sub-wiring layer 22, and includes a via hole Q; and the first sub-wiring layer 21 is electrically connected to the second sub-wiring layer 22 through the via hole Q. For example, in the direction perpendicular to the first surface 101A, the via hole Q at least partially overlaps with the first dam portion 10A.

Figure 7:
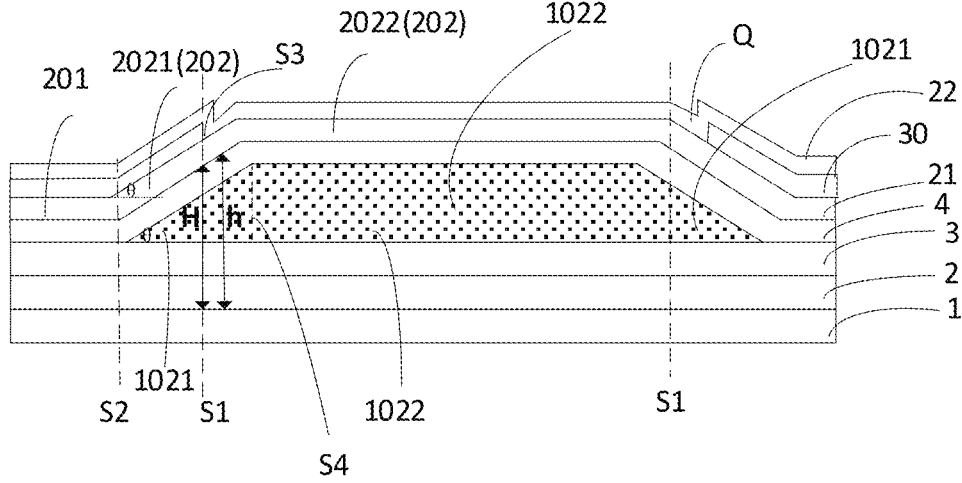
FIG. 7 is another schematic cross-sectional view of the display panel in FIG. 2 along the line N-N.

For example, as illustrated in FIG. 6 and FIG. 7, in some examples, an orthographic projection of the via hole Q on the base substrate 101 is located within the orthographic projection of the first dam portion 10A on the base substrate 101. For example, the orthographic projection of the via hole Q on the base substrate 101 is located within the orthographic projection of the second height portion 2022 on the base substrate 101.

For example, in some examples, a ratio of an area of the orthographic projection of the via hole Q on the base substrate 101 to an area of the orthographic projection of the second height portion 2022 on the base substrate 101 is greater than 0.2 and smaller than 0.8, such as 0.4, 0.6, 0.7, or the like. Therefore, the via hole Q has a sufficient size to ensure the electrical connection between the first sub-wiring layer 21 and the second sub-wiring layer 22.

For example, in some embodiments, as illustrated in FIG. 7, the boundary line S1 between the first height portion 2021 and the second height portion 2022 is substantially aligned with at least part of a boundary line S3 of the via hole Q, that is, an orthographic projection of the boundary line S1 between the first height portion 2021 and the second height portion 2022 on the base substrate 101 at least partially overlaps with an orthographic projection of at least part of the boundary line S3 of the via hole Q on the base substrate 101.

For example, in some examples, as illustrated in FIG. 4, a protective cover 316, such as a glass cover, is further provided on a side of the second sub-wiring layer 22 facing away from the base substrate 101 to protect the touch structure and form a touch surface. For example, a buffer layer 315 is further provided between the touch wire 20 and the encapsulation layer EN to facilitate the formation of the touch electrode TE and the touch wire 20. For example, in some other embodiments, the buffer layer 315 may not be provided, and the third inorganic layer 314 may be further used as the buffer layer.

For example, in some embodiments, as illustrated in FIG. 8, the display panel further includes a shielding structure 60, and the shielding structure 60 is configured to separate wires respectively on an upper side and a lower side of the shielding structure 60 to avoid signal interference. For example, in some examples, the shielding structure 60 separates wires which are configured to electrically connect circuits in the display region AA to the driving circuit DIC, for example, the shielding structure 60 separates the touch wire 20 on the upper side of the shielding structure 60 and the fan-out data signal line DCL on the lower side of the shielding structure 60. For example, an orthographic projection of the shielding structure 60 on the base substrate 101 at least partially overlaps with an orthographic projection of at least one of the plurality of sub-dams 10B on the base substrate 101.

For example, in some embodiments, as illustrated in FIG. 8, the shielding structure 60 includes a first shielding structure 61 and a second shielding structure 62, and a height of the first shielding structure 61 relative to the first surface 101A is greater than a height of the second shielding structure 62 relative to the first surface 101A. For example, in the direction perpendicular to the first surface 101A, the boundary line S1 between the first height portion 2021 and the second height portion 2022 at least partially overlaps with the first shielding structure 61.

For example, in some embodiments, as illustrated in FIG. 8, at least one of the plurality of sub-dams 10B includes a first sub-layer 1022-1 and a second sub-layer 1022-2 provided on a side of the first sub-layer 1022-1 facing away from the base substrate 101 and stacked with the first sub-layer 1022-1, the first shielding structure 61 is provided between the first sub-layer 1022-1 and the second sub-layer 1022-2, the second shielding structure 62 is provided on a side of the second sub-layer 1022-2 close to the base substrate 101; and in the direction perpendicular to the base substrate 101, the second shielding structure 62 does not overlap with the first sub-layer 1022-1, so that the first shielding structure 61 and the second shielding structure 62 realize the shielding effect at different positions.

For example, in some embodiments, as illustrated in FIG. 8, in a direction parallel to the first surface 101A, a ratio of a minimum distance L3 (that is, the horizontal distance L3 in the figure) between the boundary line S1 between the first height portion 2021 and the second height portion 2022 and an edge S5 of the first shielding structure 61 to a width L4 of the first shielding structure 61 in the extending direction (that is, the horizontal direction in the figure) of the touch wire 20 ranges from 0.3 to 0.6, such as 0.4, 0.5, or the like. Under this configuration, the first shielding structure 61 realize the shielding effect more sufficiently.

For example, in some embodiments, the shielding structure 60 is the first power supply wire VDD or the second power supply wire VSS. In this case, the first sub-layer 1022-1 is provided in the same layer as the source electrode 102C and the drain electrode 102D, and the second sub-layer 1022-2 is provided in the same layer as the first electrode 104; or, in the case where the display panel has the structure illustrated in FIG. 11, the first sub-layer 1022-1 is provided in the same layer as the connection electrode 1041, and the second sub-layer 1022-2 is provided in the same layer as the first electrode 104; or, the first sub-layer 1022-1 is provided in the same layer as the source electrode 102C and the drain electrode 102D, and the second sub-layer 1022-2 is provided in the same layer as the connection electrode 1041.

Figure 9:
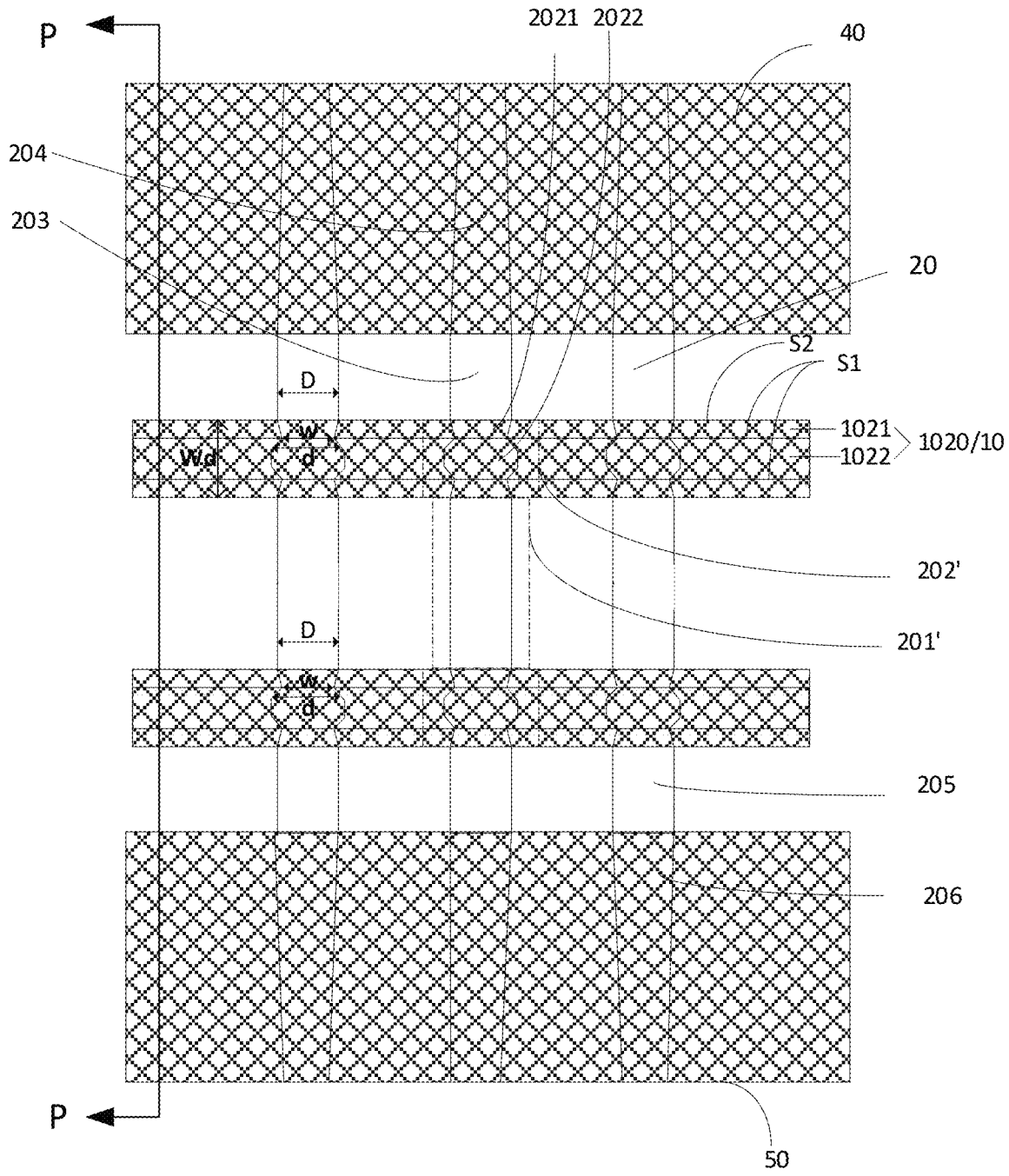
FIG. 9 is another schematic enlarged view of the portion of the display panel in FIG. 1 in the dotted frame F2.

For example, in some embodiments, FIG. 9 illustrates another schematic enlarged view of a portion of the display panel in FIG. 1 in the dotted frame F2. As illustrated in FIG. 9, the touch wire 20 further includes a third sub-portion 203 and a fourth sub-portion 204, the organic structure further includes a first organic structure 40, the first organic structure 40 covers the display region AA and a part of the peripheral region NA, and the first organic structure 40 is located on a side of the dam 10 close to the display region AA and spaced apart from the dam 10. The third sub-portion 203 is located between the first organic structure 40 and the dam 10, and the fourth sub-portion 204 is located on a side of the first organic structure 40 facing away from the base substrate 101, that is, at least part of the touch wire 20 extends through the first organic structure 40. In this case, a height of the fourth sub-portion 204 relative to the first surface 101A is greater than a height of the third sub-portion 203 relative to the first surface 101A. For example, line widths of respective positions of at least part of the fourth sub-portion 204 are inversely proportional to distances of the respective positions of the at least part of the fourth sub-portion 204 relative to the first surface 101A.

For example, as illustrated in FIG. 9, an edge of the first organic structure 40 close to the dam 10 intersects with the extending direction of the third sub-portion 203 and the fourth sub-portion 204. For example, an average line width of the fourth sub-portion 204 is smaller than an average line width of the third sub-portion 203.

For example, corresponding to the display panel illustrated in FIG. 4, the first organic structure 40 is provided in the same layer as at least one of the first planarization layer 109, the pixel defining layer 107 and the spacer 108; and corresponding to the display panel illustrated in FIG. 11, the first organic structure 40 is provided in the same layer as at least one of the first planarization layer 109, the second planarization layer 110, the pixel defining layer 107 and the spacer 108. The embodiments of the present disclosure do not limit the specific structure of the first organic structure 40.

For example, in some embodiments, as illustrated in FIG. 9, the touch wire further includes a fifth sub-portion 205 and a sixth sub-portion 206, and the organic structure further includes a second organic structure 50; for example, the second organic structure 50 covers the bending region B, and the second organic structure 50 is located on a side of the dam 10 facing away from the display region AA and spaced apart from the dam 10. The fifth sub-portion 205 is located between the dam 10 and the second organic structure 50, and the sixth sub-portion 206 is located on a side of the second organic structure 50 facing away from the base substrate 101, that is, at least a part of the touch wire 20 extends through the second organic structure 50. In this case, a height of the sixth sub-portion 206 relative to the first surface 101A is greater than a height of the fifth sub-portion 205 relative to the first surface 101A. For example, line widths of respective positions of at least part of the sixth sub-portion 206 are inversely proportional to distances of the respective positions of the at least part of the sixth sub-portion 206 relative to the first surface 101A.

For example, as illustrated in FIG. 9, an edge of the second organic structure 50 close to the dam 10 intersects with the extending direction of the fifth sub-portion 205 and the sixth sub-portion 206. For example, an average line width of the sixth sub-portion 206 is smaller than an average line width of the fifth sub-portion 205.

For example, corresponding to the display panel illustrated in FIG. 4, the second organic structure 50 is provided in the same layer as at least one of the first planarization layer 109, the pixel defining layer 107 and the spacer 108; and corresponding to the display panel illustrated in FIG. 11, the second organic structure 50 is provided in the same layer as at least one of the first planarization layer 109, the second planarization layer 110, the pixel defining layer 107 and the spacer 108. The embodiments of the present disclosure do not limit the specific structure of the second organic structure 50.

Figure 10:
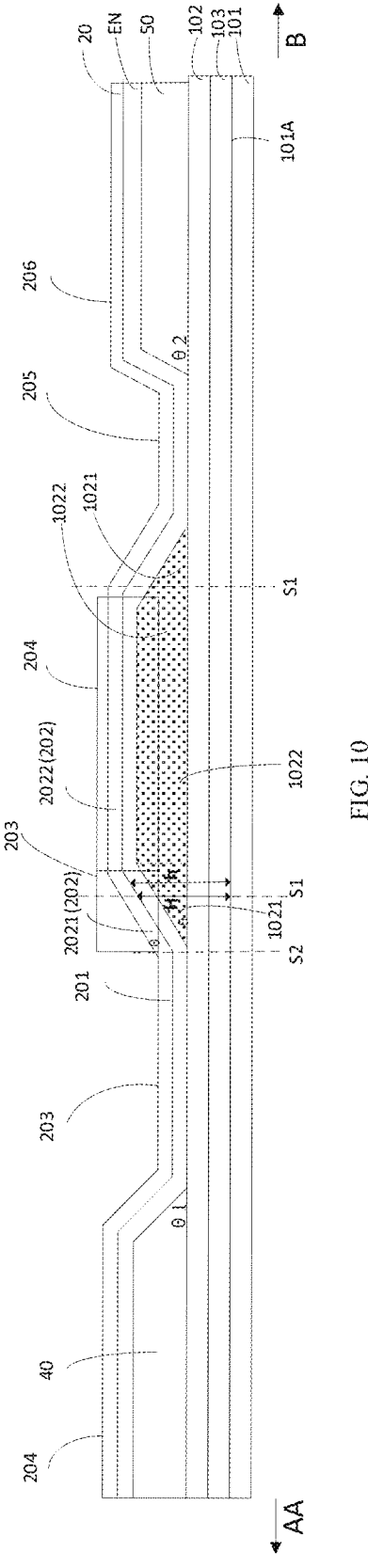
FIG. 10 is a schematic partial cross-sectional view of the display panel in FIG. 9 along a line P-P.

For example, FIG. 10 illustrates a schematic cross-sectional view of the display panel in FIG. 9 along a line P-P, and for simplicity and clarity, only one dam 10 is illustrated in the figure. As illustrated in FIG. 10, a first slope angle θ1 is between a slope of the first organic structure 40 on a side close to the dam 10 and the first surface 101A, a second slope angle θ2 is between a slope of the second organic structure 50 on a side close to the dam 10 and the first surface 101A, and a third slope angle θ is between a slope of the dam 10 and the first surface 101A. The third slope angle θ is a slope angle formed between a slope of the dam 10 close to the first organic structure 40 and the first surface 101A, or is a slope angle formed between a slope of the dam 10 close to the second organic structure 50 and the first surface 101A. For example, a difference between the first slope angle θ1 and the third slope angle θ is smaller than or equal to 20°; and/or a difference between the second slope angle θ2 and the third slope angle θ is smaller than or equal to 20°. Therefore, the difference between the slope of the first organic structure 40 and the slope of the dam 10 is small, and the difference between the slope of the second organic structure 50 and the slope of the dam 10 is also small, thereby facilitating the reliable formation of the touch wire 20 on the first organic structure 40, the dam 10 and the second organic structure 50.

For example, in some examples, the angle range of each of the first slope angle θ1, the second slope angle θ2 and the third slope angle θ is 10°-40°, such as 20°, 25°, 30°, or the like.

For example, in the embodiments of the present disclosure, each functional structure in the display panel is formed by a corresponding appropriate material. For example, the base substrate 101 is a flexible substrate such as polyimide (PI), etc., or a rigid substrate such as a quartz substrate, etc. For example, in some examples, the base substrate 101 is a stacked structure including a plurality of layers of PI. For example, structures such as a buffer layer 103 is further formed on the base substrate 101, and the buffer layer 103 for example is made of an inorganic material such as silicon oxide (SiOx), silicon nitride (SiNx), silicon oxynitride (SiON), or the like. For example, the active layer 102A is an amorphous silicon layer, a polysilicon layer, or a metal oxide semiconductor layer (for example, an IGZO layer). For example, the polysilicon is high temperature polysilicon or low temperature polysilicon. The gate electrode 102B, the source electrode 102C, and the drain electrode 102D for example each are made of a metal material such as copper (Cu), aluminum (Al), titanium (Ti), etc., or an alloy material; for example, the gate electrode 102B, the source electrode 102C, and the drain electrode 102D each are formed into a single-layer structure or a multi-layer structure, such as a three-layer stack of titanium, aluminum and titanium (Ti/Al/Ti). The material of the first electrode 104 for example is a transparent metal oxide such as indium tin oxide (ITO), indium zinc oxide (IZO), gallium zinc oxide (GZO), etc., and the material of the second electrode 106 for example is a metal material such as lithium (Li), aluminum (Al), magnesium (Mg), silver (Ag), etc. The connection electrode 1041 is made of, for example, a metal material such as copper (Cu), aluminum (Al), titanium (Ti), etc., or an alloy material.

For example, a material of each of the first inorganic layer 311, the second inorganic layer 313, and the third inorganic layer 314 includes at least one of inorganic materials such as silicon oxide (SiOx), silicon nitride (SiNx), silicon nitride (SiON), or the like. The first organic layer 312 for example includes an organic material such as polyimide, resin, or the like. For example, the first gate insulating layer 1024, the second gate insulating layer 1025, the interlayer insulating layer 1026, and the passivation layer 1027 each are made of at least one of inorganic materials such as silicon oxide (SiOx), silicon nitride (SiNx), silicon nitride (SiON), or the like, and materials of the first gate insulating layer 1024, the second gate insulating layer 1025, the interlayer insulating layer 1026, and the passivation layer 1027 may be the same or different. The pixel defining layer 107, the spacer 108, the first planarization layer 109, and the second planarization layer 110 for example each are made of organic materials such as polyimide, resin, or the like, and materials of the pixel defining layer 107, the spacer 108, the first planarization layer 109, and the second planarization layer 110 may be the same or different. The embodiments of the present disclosure do not specifically limit the materials of the various functional structures of the display panel.

At least one embodiment of the present disclosure further provides a display device, the display device includes any display panel provided by the embodiments of the present disclosure. For example, the display device is any product or component with a display function, such as a mobile phone, a tablet computer, a television, a monitor, a notebook computer, a digital photo frame, a navigator, or the like. The embodiments of the present disclosure do not limit the specific form of the display device.

The following statements should be noted:

(1) The drawings involve only the structure(s) in connection with the embodiment(s) of the present disclosure, and other structure(s) may refer to common design(s).

(2) For clarity, in the drawings used to describe the embodiments of the present disclosure, the thicknesses of layers or regions are enlarged or reduced, that is, the drawings are not drawn to actual scale. It can be understood that when a component such as a layer, film, region or substrate is referred to as being "on" or "under" another component, the component may be "directly" "on" or "under" another component, or one or more intermediate components may be interposed therebetween.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A display panel, comprising a display region and a peripheral region surrounding the display region, and further comprising:

a base substrate;

a driving circuit layer provided on the base substrate;

a display structure layer provided on a side of the driving circuit layer facing away from the base substrate;

an encapsulation layer provided on a side of the display structure layer facing away from the base substrate;

a touch electrode provided on a side of the encapsulation layer facing away from the base substrate and at least located in the display region; and a touch wire provided on the side of the encapsulation layer facing away from the base substrate, and electrically connected to the touch electrode, wherein the touch wire comprises a first sub-portion and a second sub-portion electrically connected to the first sub-portion, a main surface of the base substrate close to the touch wire is a first surface, and a distance between the first sub-portion and the first surface is smaller than a distance between the second sub-portion and the first surface;

wherein the second sub-portion comprises a first height portion and a second height portion electrically connected to the first height portion, the first height portion is located between the first sub-portion and the second height portion, a height of the first height portion relative to the first surface is smaller than a height of the second height portion relative to the first surface, line widths of respective positions of the first height portion are inversely proportional to heights of the respective positions of the first height portion relative to the first surface, and line widths of respective positions of at least part of the second height portion are proportional to heights of the respective positions of the at least part of the second height portion relative to the first surface, wherein the touch wire further comprises a first sub-wiring layer and a second sub-wiring layer located on a side of the first sub-wiring layer facing away from the base substrate;

the display panel further comprises a touch insulating layer, the touch insulating layer is between the first sub-wiring layer and the second sub-wiring layer, the touch insulating layer comprises a via hole, and the first sub-wiring layer is electrically connected to the second sub-wiring layer through the via hole; and an orthographic projection of the via hole on the base substrate is located within an orthographic projection of the second height portion on the base substrate.

2. The display panel according to claim 1, wherein an average line width of the first height portion is smaller than an average line width of the second height portion.

3. The display panel according to claim 1, wherein a ratio of a maximum line width of the first height portion to a maximum line width of the second height portion ranges from 0.50 to 0.95;

a height of the second sub-portion, corresponding to a boundary line between the first height portion and the second height portion, relative to the first surface is H, and a line width of the second sub-portion corresponding to the boundary line is W, then $H/W=0.150\sim0.375$.

4. The display panel according to claim 1, wherein an average line width of the first sub-portion is smaller than an average line width of the second sub-portion.

5. The display panel according to claim 1, further comprising an organic structure, wherein the organic structure is at least partially located in the peripheral region, wherein the touch wire is provided on a side of the organic structure facing away from the base substrate, and at least one edge of the organic structure intersects with an extending direction of the touch wire, and the organic structure comprises an organic slope portion and an organic flat portion;

the second sub-portion comprises a slope portion and a flat portion, the slope portion comprises the first height portion and a part of the second height portion, the flat portion comprises the other part of the second height portion, and a slope degree of the slope portion of the second sub-portion is substantially the same as a slope degree of the organic slope portion; and an orthographic projection of the slope portion of the second sub-portion on the base substrate overlaps with an orthographic projection of the organic slope portion on the base substrate, and an orthographic projection of the flat portion of the second sub-portion on the base substrate overlaps with an orthographic projection of the organic flat portion on the base substrate.

6. The display panel according to claim 5, wherein the organic structure further comprises a dam, the dam at least partially surrounds the display region, and the dam comprises a first dam portion located on at least one side of the display region;

the touch wire comprises a first wire portion, an extending direction of the first wire portion intersects with an extending direction of the first dam portion, and an orthographic projection of at least part of the first wire portion on the base substrate overlaps with an orthographic projection of the first dam portion on the base substrate;

the first dam portion comprises a plurality of sub-dams arranged at intervals in a direction facing away from the display region, the first sub-portion comprises a first portion of the first wire portion located between adjacent sub-dams among the plurality of sub-dams, and the second sub-portion comprises a second portion of the first wire portion located on a side of each of the plurality of sub-dams facing away from the base substrate.

7. The display panel according to claim 6, wherein a boundary line between the first height portion and the second height portion is substantially aligned with at least part of a boundary line of the via hole.

8. The display panel according to claim 6, further comprising a shielding structure, wherein an orthographic projection of the shielding structure on the base substrate at least partially overlaps with an orthographic projection of at least one of the plurality of sub-dams on the base substrate;

the shielding structure comprises a first shielding structure and a second shielding structure, and a height of the first shielding structure relative to the first surface is greater than a height of the second shielding structure relative to the first surface; and a boundary line between the first height portion and the second height portion at least partially overlaps with the first shielding structure in a direction perpendicular to the first surface.

9. The display panel according to claim 8, wherein at least one of the plurality of sub-dams comprises a first sub-layer and a second sub-layer located on a side of the first sub-layer facing away from the base substrate and stacked with the first sub-layer, the first shielding structure is located between the first sub-layer and the second sub-layer, the second shielding structure is located on a side of the second sub-layer close to the base substrate and does not overlap with the first sub-layer in a direction perpendicular to the base substrate.

10. The display panel according to claim 6, wherein the touch wire further comprises a third sub-portion and a fourth sub-portion, the organic structure further comprises a first organic structure, the first organic structure covers the display region and a part of the peripheral region, and the first organic structure is located on a side of the dam close to the display region and spaced apart from the dam;

the third sub-portion is located between the first organic structure and the dam, and the fourth sub-portion is located on a side of the first organic structure facing away from the base substrate;

line widths of respective positions of at least part of the fourth sub-portion are inversely proportional to distances of the respective positions of the at least part of the fourth sub-portion relative to the first surface; and an edge of the first organic structure close to the dam intersects with an extending direction of the third sub-portion and the fourth sub-portion.

11. The display panel according to claim 10, wherein an average line width of the fourth sub-portion is smaller than an average line width of the third sub-portion.

12. The display panel according to claim 6, wherein the touch wire further comprises a fifth sub-portion and a sixth sub-portion, the organic structure further comprises a second organic structure, and the second organic structure is located on a side of the dam facing away from the display region and spaced apart from the dam;

the fifth sub-portion is located between the dam and the second organic structure, and the sixth sub-portion is located on a side of the second organic structure facing away from the base substrate;

line widths of respective positions of at least part of the sixth sub-portion are inversely proportional to distances of the respective positions of the at least part of the sixth sub-portion relative to the first surface; and an edge of the second organic structure close to the dam intersects with an extending direction of the fifth sub-portion and the sixth sub-portion.

13. The display panel according to claim 12, wherein an average line width of the sixth sub-portion is smaller than an average line width of the fifth sub-portion.

14. The display panel according to claim 12, wherein a first slope angle is between a slope of the first organic structure on a side close to the dam and the first surface, a second slope angle is between a slope of the second organic structure on a side close to the dam and the first surface, and a third slope angle is between a slope of the dam and the first surface;

a difference between the first slope angle and the third slope angle is smaller than or equal to 20°; and/or a difference between the second slope angle and the third slope angle is smaller than or equal to 20°.

15. The display panel according to claim 5, wherein a ratio of a length of the first portion in an extending direction of the first portion to a width of the first portion in a direction perpendicular to the extending direction of the first portion ranges from 1.4 to 3.4;

a ratio of a length of the first portion in an extending direction of the first portion to a width of each of the plurality of sub-dams ranges from 0.7 to 1.3; and a width of each of the plurality of sub-dams is in a direction perpendicular to an extending direction of each of the plurality of sub-dams.

16. The display panel according to claim 5, wherein the driving circuit layer comprises a pixel driving circuit and a data line electrically connected to the pixel driving circuit, the display structure layer comprises a light-emitting element, the pixel driving circuit is configured to be electrically connected to the light-emitting element to drive the light-emitting element, the data line is configured to provide a data signal to the pixel driving circuit, the peripheral region further comprises a fan-out data signal line, and the fan-out data signal line is electrically connected to the data line;

an orthographic projection of the fan-out data signal line on the base substrate at least partially overlaps with an orthographic projection of the first dam portion on the base substrate, and the orthographic projection of the fan-out data signal line on the base substrate at least partially overlaps with an orthographic projection of the first wire portion on the base substrate; and an extending direction of at least part of the fan-out data signal line intersects with an extending direction of the first dam portion, and intersects with an extending direction of the first wire portion.

17. A display panel, comprising a display region and a peripheral region surrounding the display region, and further comprising:

a base substrate;

a driving circuit layer provided on the base substrate;

a display structure layer provided on a side of the driving circuit layer facing away from the base substrate;

an encapsulation layer provided on a side of the display structure layer facing away from the base substrate;

a touch electrode provided on a side of the encapsulation layer facing away from the base substrate, and at least located in the display region;

a touch wire provided on the side of the encapsulation layer facing away from the base substrate, and electrically connected to the touch electrode, wherein the touch wire comprises a first sub-portion and a second sub-portion electrically connected to the first sub-portion, a main surface of the base substrate close to the touch wire is a first surface, and a distance between the first sub-portion and the first surface is smaller than a distance between the second sub-portion and the first surface;

the second sub-portion comprises a first height portion and a second height portion electrically connected to the first height portion, the first height portion is located between the first sub-portion and the second height portion, a height of the first height portion relative to the first surface is smaller than a height of the second height portion relative to the first surface, line widths of respective positions of the first height portion are inversely proportional to heights of the respective positions of the first height portion relative to the first surface, and line widths of respective positions of at least part of the second height portion are proportional to heights of the respective positions of the at least part of the second height portion relative to the first surface;

wherein a height of the second sub-portion relative to the first surface at a position is h, an included angle between a surface of the second sub-portion facing away from the base substrate and the first surface is θ, and a line width of the second sub-portion at the position is d, a height of the second sub-portion, corresponding to a boundary line between the first height portion and the second height portion, relative to the first surface is H, then $0 < H < 3$ μm, $0 < \theta < 30°$; and a compensation width of d relative to W is $\Delta d$, and $\Delta d = (d-W) = K*(h-H)/\tan \theta$, where $0.5 < K < 10$.

18. The display panel according to claim 17, wherein $1$ μm $< H < 2.5$ μm, $15° < \theta < 25°$, $\Delta d = (d-W) = K*(h-H)/\tan \theta$, where $0.5 < K < 2$; or $1.2$ μm $< H < 1.7$ μm, $17° < \theta < 23°$, $\Delta d = (d-W) = K*(h-H)/\tan \theta$, where $0.8 < K < 1.3$.

19. A display panel, comprising a display region and a peripheral region surrounding the display region, and further comprising:

a base substrate;

a driving circuit layer provided on the base substrate;

a display structure layer provided on a side of the driving circuit layer facing away from the base substrate;

an encapsulation layer provided on a side of the display structure layer facing away from the base substrate;

a touch electrode provided on a side of the encapsulation layer facing away from the base substrate, and at least located in the display region;

a touch wire provided on the side of the encapsulation layer facing away from the base substrate, and electrically connected to the touch electrode, wherein the touch wire comprises a first sub-portion and a second sub-portion electrically connected to the first sub-portion, a main surface of the base substrate close to the touch wire is a first surface, and a distance between the first sub-portion and the first surface is smaller than a distance between the second sub-portion and the first surface;

the second sub-portion comprises a first height portion and a second height portion electrically connected to the first height portion, the first height portion is located between the first sub-portion and the second height portion, a height of the first height portion relative to the first surface is smaller than a height of the second height portion relative to the first surface, line widths of respective positions of the first height portion are inversely proportional to heights of the respective positions of the first height portion relative to the first surface, and line widths of respective positions of at least part of the second height portion are proportional to heights of the respective positions of the at least part of the second height portion relative to the first surface;

the display panel further comprises an organic structure comprising an organic slope portion and an organic flat portion, the organic structure is at least partially located in the peripheral region, the organic slope portion comprises a first slope sub-portion and a second slope sub-portion, and the second slope sub-portion is located on a side of the first slope sub-portion facing the organic flat portion; and an average slope degree of the first slope sub-portion is greater than an average slope degree of the second slope sub-portion.

* * * * *